(12) United States Patent
Wang et al.

(10) Patent No.: US 12,032,257 B2
(45) Date of Patent: Jul. 9, 2024

(54) ARRAY SUBSTRATE AND DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Xiao Wang, Beijing (CN); Yan Yan, Beijing (CN); Yu Ma, Beijing (CN); Weitao Chen, Beijing (CN); Jiliang Zhang, Beijing (CN)

(73) Assignees: Beijing BOE Display Technology Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/021,205

(22) PCT Filed: Mar. 10, 2022

(86) PCT No.: PCT/CN2022/080085
§ 371 (c)(1),
(2) Date: Feb. 14, 2023

(87) PCT Pub. No.: WO2023/273402
PCT Pub. Date: Jan. 5, 2023

(65) Prior Publication Data
US 2023/0314888 A1    Oct. 5, 2023

(30) Foreign Application Priority Data

Jun. 29, 2021 (CN) .......................... 202110727820.0

(51) Int. Cl.
*G02F 1/1362* (2006.01)
*G02F 1/1333* (2006.01)
*G06F 3/041* (2006.01)

(52) U.S. Cl.
CPC ...... *G02F 1/13629* (2021.01); *G02F 1/13338* (2013.01); *G02F 1/136227* (2013.01); *G06F 3/0412* (2013.01); *G06F 3/04164* (2019.05)

(58) Field of Classification Search
CPC ............. G02F 1/13629; G02F 1/13338; G02F 1/136227; G06F 3/0412; G06F 3/04164
See application file for complete search history.

(56) References Cited

U.S. PATENT DOCUMENTS

2016/0357291 A1* 12/2016 Chen ..................... G06F 3/0412

FOREIGN PATENT DOCUMENTS

| CN | 106896556 A | 6/2017 |
| CN | 107193419 A | 9/2017 |
| CN | 107305449 A | 10/2017 |
| WO | 2021087650 A1 | 5/2021 |

* cited by examiner

*Primary Examiner* — James A Dudek
(74) *Attorney, Agent, or Firm* — HOUTTEMAN LAW LLC

(57) ABSTRACT

An array substrate including: a substrate; a data line on the base substrate and extending in a first direction; and a touch signal line on the base substrate, wherein an extending direction of the touch signal line is the same as an extending direction of the data line; the data line and the touch signal line are in different layers and insulated from each other, and an orthographic projection of the touch signal line on the base substrate at least partially overlaps an orthographic projection of the data line on the base substrate.

19 Claims, 6 Drawing Sheets

ARRAY SUBSTRATE AND DISPLAY APPARATUS

TECHNICAL FIELD

The present disclosure belongs to the field of touch display technology, and particularly relates to an array substrate and a display apparatus.

BACKGROUND

A liquid crystal display panel is mainly applied in a display device such as a notebook computer, a television, or the like. The liquid crystal display panel mainly includes an array substrate and an opposite substrate 61 which are opposite to each other, and a liquid crystal layer arranged between the array substrate and the opposite substrate 61. When the liquid crystal display panel operates, a driving electric field is generated between the array substrate and the opposite substrate 61, and liquid crystal molecules in the liquid crystal layer are deflected under the driving action of the driving electric field, so that the display function of the liquid crystal display panel is realized.

With the rapid development of display technology, the application of a touch screen has become very popular. An in-cell (embedded in a cell) touch screen embeds the touch electrode unit of the touch screen inside the liquid crystal display screen, so that the thickness of the module can be reduced, the manufacturing cost can be reduced. Therefore, the in-cell touch screen has the advantages of integration, lightness and low profile, low cost, low power consumption, high image quality, Multi-Touch realization, and the like, is favored by consumers and panel manufacturers, and becomes a new development trend in the future.

In the conventional in-cell touch screen in the prior art, the pixel aperture ratio is low.

SUMMARY

The present disclosure at least partially solves the problem of the low pixel aperture ratio in an existing in-cell touch screen, and thus, provides an array substrate and a display apparatus.

A first aspect of the present disclosure provides an array substrate, including:
a substrate;
at least one data line on the base substrate and extending in a first direction; and
at least one touch signal line on the base substrate, where an extending direction of each of the touch signal line is the same as an extending direction of a corresponding data line; the data line and the touch signal line are in different layers and insulated from each other, and an orthographic projection of the touch signal line on the base substrate at least partially overlaps an orthographic projection of the data line on the base substrate.

Optionally, the touch signal line is on a side of the data line away from the base substrate.

Optionally, the orthographic projection of the touch signal line on the base substrate completely covers the orthographic projection of the data line on the base substrate.

Optionally, the touch signal line has a center line extending in the first direction; the data line has a center line extending in the first direction; and
an orthographic projection of the center line of the touch signal line on the base substrate completely overlaps an orthographic projection of the center line of the data line on the base substrate.

Optionally, a size of the touch signal line in a second direction is greater than a size of the data line in the second direction; and the second direction is perpendicular to the first direction.

Optionally, the array substrate further includes a plurality of touch electrode units, each of which is coupled to a corresponding touch signal line; a layer, where the touch electrode unit is located, is on a side of the data line away from the base substrate;
an orthographic projection of a gap between two touch electrode units adjacent in a second direction on the base substrate overlaps the orthographic projection of the data line on the base substrate; and
the second direction is perpendicular to the first direction.

Optionally, the layer, where the touch electrode unit is located, is between a layer where the touch signal line is located and a layer where the data line is located.

Optionally, an orthographic projection of the touch electrode unit on the base substrate partially overlaps an orthographic projection of the touch signal line on the base substrate.

Optionally, a length of an overlapping part between the orthographic projection of the touch electrode unit on the base substrate and the orthographic projection of the touch signal line on the base substrate in the second direction is in a range of 1.5 to 3 micrometers.

Optionally, the array substrate further includes an organic insulating layer between a layer where the data line is located and a layer where the touch electrode unit is located.

Optionally, the array substrate further includes a plurality of gate lines and a plurality of sub-pixels, and the at least one data line includes a plurality of data lines, and
the plurality of gate lines and the plurality of data lines define a plurality of sub-pixel regions, and the plurality of sub-pixels are correspondingly located in the plurality of sub-pixel regions; and each of the plurality of sub-pixels includes a pixel electrode and a common electrode.

Optionally, the array substrate includes a plurality of touch sub-regions, and the plurality of touch electrode units are located in the plurality of touch sub-regions in a one-to-one correspondence; each of the plurality of touch sub-region corresponds to multiple sub-pixel regions; and
the common electrodes of the sub-pixels in a same touch sub-region are coupled together, and the coupled common electrodes also serves as the touch electrode unit in the touch sub-region.

Optionally, the array substrate further includes a first passivation layer; a layer where the common electrode is located, the first passivation layer, a layer where the touch signal line is located, and a layer where the pixel electrode is located, are sequentially arranged in a direction away from the base substrate; and
the common electrode is coupled to the touch signal line through a first connection via at least penetrating through the first passivation layer.

Optionally, the array substrate further includes a second passivation layer on a side of the layer, where the touch signal line is located, away from the base substrate;
the first connection via includes a first part and a second part, the first part penetrates through the first passivation layer, the layer where the touch signal line is located and the second passivation layer, exposing at least a part of the common electrode; and the second part penetrates through the second passivation layer, exposing at least a part of the touch signal line; and the array substrate further includes a first connection pattern, and an orthographic projection of the first connection pattern on the base substrate covers orthographic projections of the first part and the second part of the first connection via on the base substrate, such that the first connection pattern couples the common electrode and the touch signal line together.

Optionally, the first connection pattern is in a same layer and is made of a same material as the pixel electrode.

Optionally, the sub-pixels further include a driving circuit, at least a part of an output electrode of the driving circuit is on a side of the organic insulating layer close to the base substrate; and the pixel electrode is coupled to the output electrode through a second connection via, and the second connection via penetrates through at least the organic insulating layer, the first passivation layer and the second passivation layer to expose the output electrode of the driving circuit, such that the pixel electrode is coupled to the output electrode.

Optionally, the driving circuit includes a driving transistor; the second connection via includes a first sub-via and a second sub-via; the first sub-via penetrates through the organic insulating layer, the second sub-via penetrates through the first passivation layer and the second passivation layer, and an orthographic projection of the first sub-via on the base substrate includes an orthographic projection of the second sub-via on the base substrate; and the pixel electrode is coupled to the output electrode through the second sub-via.

Optionally, the array substrate further includes an auxiliary electrode between two of the sub-pixel regions adjacent in a first direction and extending in the second direction; the common electrodes in the same touch sub-region are coupled together through the auxiliary electrode; and the auxiliary electrode has a conductivity greater than that of the common electrode.

Optionally, the auxiliary electrode is insulated from the gate line, and is in a same layer and made of a same material as the gate line.

Optionally, the array substrate further includes a gate insulating layer, a third connection via, and a second connection pattern; at least a part of the gate insulating layer is on a side of the auxiliary electrode away from the base substrate; the third connection via includes a third sub-via and a fourth sub-via; the third sub-via penetrates through the organic insulating layer; the fourth sub-via penetrates through the second passivation layer and the first passivation layer, exposing the auxiliary electrode and the common electrode; an orthographic projection of the third sub-via on the base substrate includes an orthographic projection of the fourth sub-via on the base substrate; and an orthographic projection of the second connection pattern on the base substrate covers the orthographic projection of the fourth sub-via on the base substrate, such that the second connection pattern couples the auxiliary electrode and the common electrode together.

Based on the above technical scheme of the array substrate, a second aspect of the present disclosure provides a display apparatus, including any one of the above array substrates.

BRIEF DESCRIPTION OF DRAWINGS

The accompanying drawings, which are included to provide a further understanding of the present disclosure and constitute a part of this specification, serve to explain the present disclosure together with the following specific embodiments, but do not constitute a limitation to the present disclosure. In the drawings.

DETAIL DESCRIPTION OF EMBODIMENTS

Figure 1:
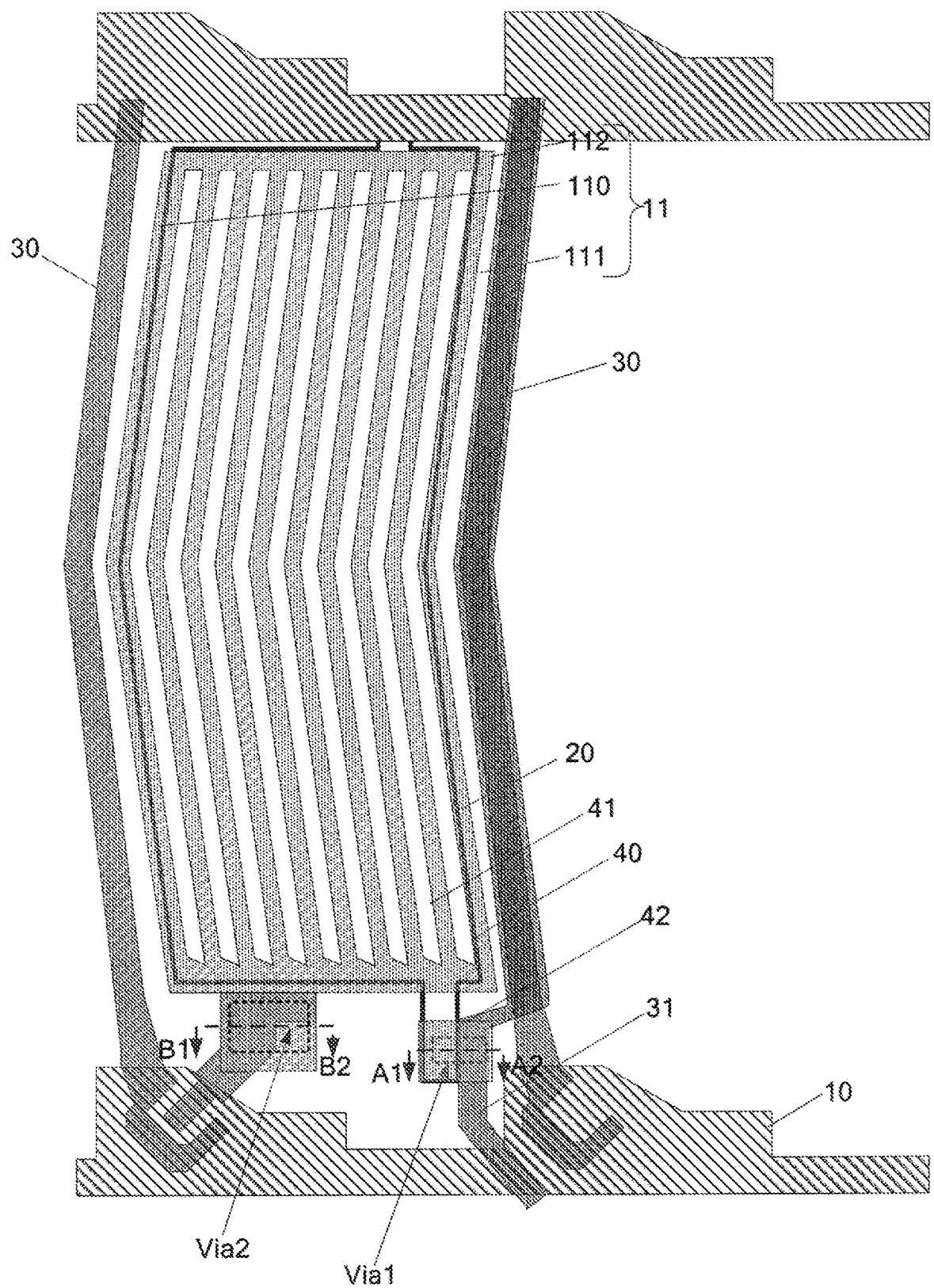
FIG. 1 is a schematic diagram illustrating a first layout of a sub-pixel according to an embodiment of the present disclosure.

In order to enable one of ordinary skill in the art to better understand the technical solutions of the present disclosure, the present disclosure will be further described in detail below with reference to the accompanying drawings and the specific embodiments.

In the present disclosure, two structures "arranged in a same layer" means that the two structures are formed from a same material layer, and thus are in the same layer in a stacked relationship, but does not represent that they are equidistant from the base substrate 60, nor that other layer structures between the two structures and the base substrate 60 are completely identical.

In the present disclosure, a "patterning process" refers to a step of forming a structure having a specific pattern, which may be a photolithography process including one or more in steps of forming a material layer, coating a photoresist, exposing, developing, etching, stripping the photoresist, and the like. Alternatively, the "patterning process" may be an imprinting process, an inkjet printing process, or other processes.

The present disclosure will be described in more detail below with reference to the accompanying drawings. The same elements are denoted by like reference characters throughout the various figures. For purposes of clarity, the various parts in the drawings are not drawn to scale. Moreover, certain well-known parts may not be shown in the figures.

Numerous specific details of the present disclosure, such as structures, materials, dimensions, processing methods and techniques of the components, are set forth in the following description in order to provide a more thorough understanding of the present disclosure. However, as will be understood by one of ordinary skill in the art, the present disclosure may not be implemented according to these specific details.

The present disclosure discloses an array substrate, both a touch electrode layer and a touch signal line 31 are integrated inside the array substrate, so that when the array substrate is included a liquid crystal display panel, the touch electrode layer and the touch signal line 31 for realizing a touch function may be integrated inside the liquid crystal display panel, so as to realize a liquid crystal touch display panel with an in-cell touch (Full In Cell Touch) structure. The liquid crystal touch display panel with the Full In Cell Touch structure integrates the touch function and the display function, so that it not only can realize one-stop seamless production, but also has the advantages of integration, lightness and thinness, low cost, low power consumption, high image quality, capability of realizing a multi-type touch (i.e., Multi-Touch), and the like.

When the touch electrode layer and the touch signal line 31 are integrated inside the array substrate, the touch signal line 31 and a data line 30 in the array substrate are generally arranged side by side in a non-aperture region between adjacent sub-pixel columns. Since the touch signal line 31 and the data line 30 are arranged in a same layer and made of a same material, a distance between the data line 30 and the touch signal line 31 in the same non-aperture region (the distance between the data line 30 and the touch signal line 31 in the same non-aperture region is generally greater than or equal to 6.5 μm at present) is required to be increased to avoid a short circuit between the data line 30 and the touch signal line 31. However, in such a manner, it will reduce the aperture ratio of the liquid crystal display panel, which is not favorable for improving the display quality of the liquid crystal display panel.

Based on the above problems, in the present disclosure, the touch signal line 31 and the data line 30 are arranged in different layers and insulated from each other, so that the problem of short circuit between the data line 30 and the touch signal line 31 does not need to be considered. That is, a spacing between the touch signal line 31 and the data line 30 in the plane of the array substrate does not need to be particularly limited, and thus the limitation on the size of the non-aperture region between adjacent sub-pixel columns due to the touch signal line 31 and the data line 30 can be reduced compared with the prior art, thereby improving the aperture ratio of the liquid crystal display panel.

Referring to FIGS. 1 to 9, an embodiment of the present disclosure provides an array substrate. The array substrate includes: a base substrate 60; a data line 30 arranged on the base substrate 60 and extending in a first direction; and a touch signal line 31 arranged on the base substrate 60. An extending direction of the touch signal line 31 is the same as an extending direction of the data line 30. The data line 30 and the touch signal line 31 are arranged in different layers and insulated from each other, and an orthographic projection of the touch signal line 31 on the base substrate 60 at least partially overlaps an orthographic projection of the data line 30 on the base substrate 60.

Illustratively, the first direction includes a vertical direction, and a second direction includes a horizontal direction.

Illustratively, the touch signal line 31 may be coupled to a corresponding touch electrode unit in the array substrate and a chip subsequently bonded on the array substrate. After the array substrate and an opposite substrate 61 are aligned and assembled to form a liquid crystal display panel, when a touch operation occurs in a touch region of the liquid crystal display panel, the touch operation may change a touch signal formed in a touch electrode unit in the array substrate. Meanwhile, the touch signal line 31 is used for transmitting the touch signal acquired in the touch electrode unit to the chip, and the chip determines a specific touch position according to the touch signals received from the respective touch signal lines 31.

In the present disclosure, when arranging the touch signal line 31, the touch signal line 31 and the data line 30 are not arranged in a same layer any more. With such an arrangement, the problem of short circuit between the touch signal line 31 and the data line 30 does not need to be considered, so that the spacing between the touch signal line 31 and the data line 30 in the array substrate in the plane of the array substrate does not need to be particularly limited, and orthographic projections of the touch signal line 31 and the data line 30 on the base substrate 60 may even overlap each other. Therefore, through such an arrangement according to the present disclosure, an area of the non-aperture region at the periphery of the sub-pixel can be effectively reduced, thereby improving the pixel aperture ratio of the liquid crystal display panel formed by the array substrate by about 6%.

Furthermore, in the prior art, during an alignment process, a rubbing cloth is required to rub the alignment film along the direction perpendicular to the extending direction of the data line 30, so that when the rubbing cloth rubs near the data line 30 and the touch signal line 31, the rubbing cloth should climb up at the position of the data line 30, it is prone to cause a large alignment shadow (i.e., Rubbing Shadow) region (a width of the alignment shadow region in the prior art is about 6.5 μm) near the data line 30, where it is prone to generate a light leakage phenomenon. Therefore, the pixel non-aperture region is required to be shielded by a black matrix pattern on the opposite substrate 61 after the cell process. In the case where the touch signal line 31 is provided in the non-aperture region, when the array substrate and the opposite substrate 61 are aligned and assembled to form a cell, the assembly margin should be also considered from the touch signal line 31, and the area of the black matrix pattern on the opposite substrate 61 should be increased, that is, it will increase the width of the black matrix pattern in the direction perpendicular to the extending direction of the data line 30, which results in a decrease of the aperture ratio of the liquid crystal display panel. In the array substrate according to the embodiment of the present disclosure, by setting the orthographic projection of the touch signal line 31 on the base substrate 60 to partially overlap the orthographic projection of the data line 30 on the base substrate 60, when the array substrate and the opposite substrate 61 are aligned and assembled to form a cell, the width increase of the black matrix pattern in the direction perpendicular to the extending direction of the data line 30 caused by the factors based on the touch signal line 31 is reduced, so that the area of the black matrix pattern on the opposite substrate 61 can effectively reduced.

Illustratively, in the array substrate, the material of the base substrate 60 may be selected according to actual requirements, and illustratively, a glass substrate 60 may be used, but is not limited thereto.

Illustratively, the touch signal line 31 is coupled to a corresponding touch electrode unit in the array substrate and a chip subsequently bonded on the array substrate. After the array substrate and an opposite substrate 61 are aligned and assembled to form a liquid crystal display panel, when a touch operation occurs in a touch region of the liquid crystal display panel, the touch operation may change a touch signal formed in a touch electrode unit in the array substrate. Meanwhile, the touch signal line 31 is used for transmitting the touch signal acquired in the touch electrode unit to the chip, and the chip determines a specific touch position according to the touch signals received from the respective touch signal lines 31.

Figure 5:
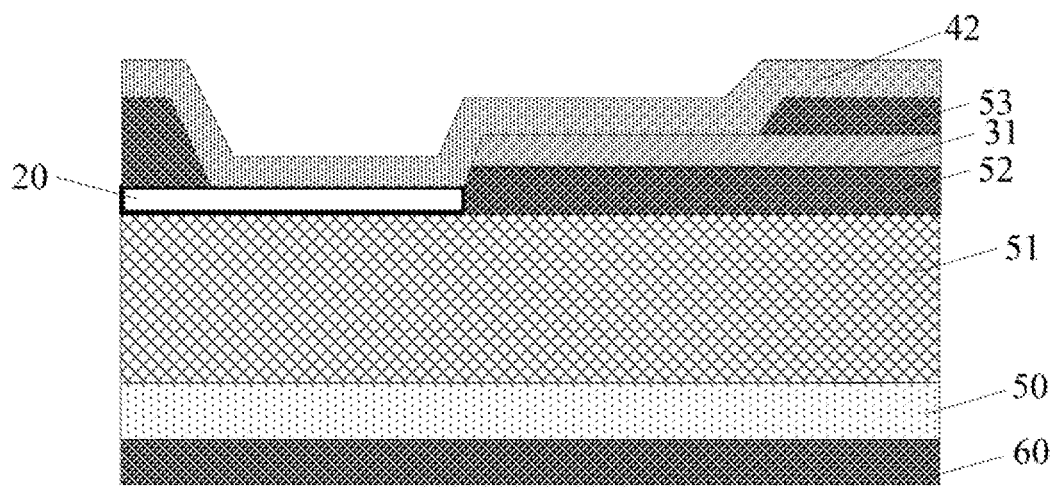
FIG. 5 is a schematic cross-sectional view taken along a line A1A2 in FIG. 1 or FIG. 4.

In some embodiments, the touch signal line 31 is located on a side of the data line 30 away from the base substrate 60. Referring to FIG. 5, a layer, where the touch signal line 31 is located, is above a layer, where the data line 30 is located, and the two layers may be insulated and separated by an insulating layer structure. In the embodiment of the present disclosure, by arranging the touch signal line 31 on the side of the data line 30 away from the base substrate 60 (the touch signal line 31 is located above the data line 30 in FIG. 5), after the array substrate and the opposite substrate 61 are aligned and assembled to form a cell, the touch signal line 31 is located between the data line 30 and the liquid crystal layer. Meanwhile, the orthographic projections of the touch signal line 31 and the data line 30 on the base substrate 60 overlap each other. In this case, the touch signal line 31 can shield the data line 30 to a certain extent, and the electric field of the data line 30 is shielded to a certain extent, so that the influence of the electric field of the data line 30 on the liquid crystal is reduced, and the dependence on the shading effect of the black matrix is weakened, that is, the area of the black matrix pattern on the opposite substrate 61 can be effectively reduced.

Figure 9:
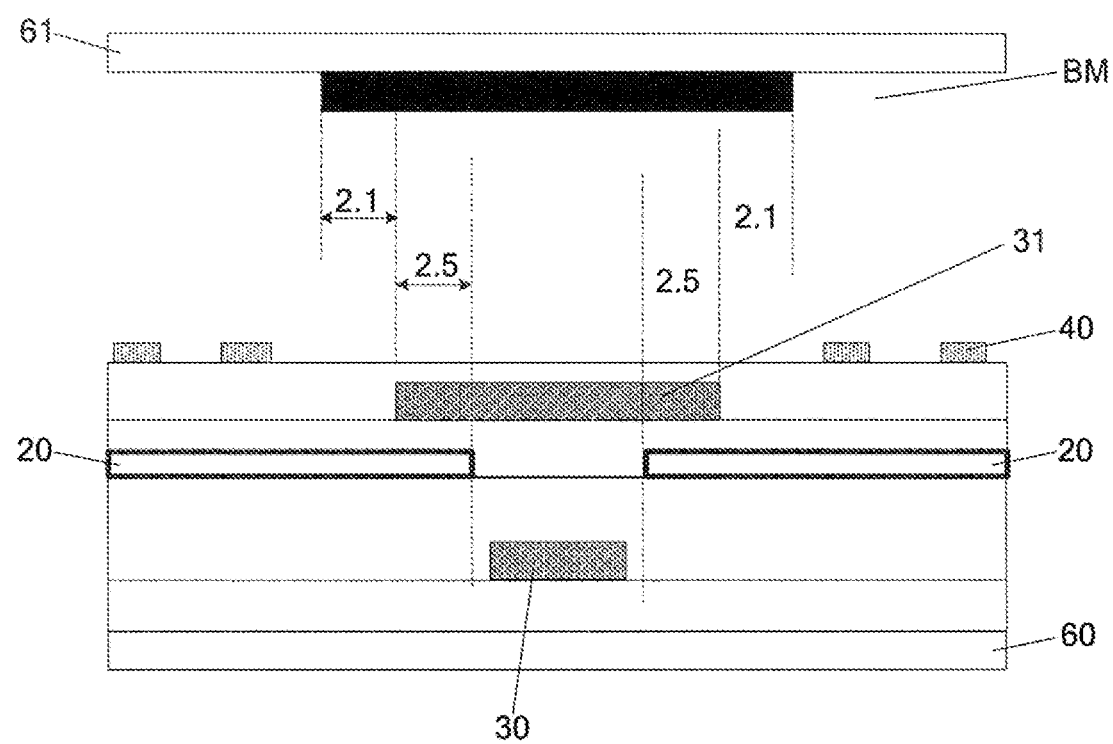
FIG. 9 is a schematic diagram illustrating a positional relationship between a black matrix and a touch signal line and a data line according to an embodiment of the present disclosure.

In some embodiments, the orthographic projection of the touch signal line 31 on the base substrate 60 completely covers the orthographic projection of the data line 30 on the base substrate 60. Referring to FIG. 9, in an embodiment of the present disclosure, the touch signal line 31 is located on a side of the data line 30 away from the base substrate 60. That is, after the array substrate and the opposite substrate 61 are aligned and assembled to form a cell, the touch signal line 31 is located on a side of the data line 30 close to the light emitting surface of the display panel. Where the orthographic projection of the touch signal line 31 on the base substrate 60 completely covers the orthographic projection of the data line 30 on the base substrate 60, the touch signal line 31 can completely wrap the data line 30, so that the shielding effect on the electric field of the data line 30 can be increased, and the influence of the electric field of the data line 30 on liquid crystal can be weakened.

Further optionally, in some embodiments, the touch signal line 31 has a center line extending along the first direction; the data line 30 has a center line extending in the first direction; and an orthographic projection of the center line of the touch signal line 31 on the base substrate 60 completely overlaps an orthographic projection of the center line of the data line 30 on the base substrate 60. Referring to FIG. 9, in the embodiment of the present disclosure, the center of the touch signal line 31 overlaps the center of the data line 30. In this case, the signal line can be wrapped by the touch signal line 31, and the degree of wrapping the signal line by the touch signal line 31 is the same on two sides in the second direction, so that the light emitting display of two adjacent sub-pixels located at both sides of the touch signal line 31 is the same, and the display effect of the display panel is ensured.

Optionally, in some embodiments, a size of the touch signal line 31 in the second direction is greater than a size of the data line 30 in the second direction. That is, the width of the touch signal line 31 is greater than the width of the data line 30. Referring to FIG. 9, in an embodiment of the present disclosure, the touch signal line 31 is located on a side of the data line 30 away from the base substrate 60. That is, after the array substrate and the opposite substrate 61 are aligned and assembled to form a cell, the touch signal line 31 is located on a side of the data line 30 close to the light emitting surface of the display panel. Where the width of the touch signal line 31 is greater than the width of the data line 30, the touch signal line 31 can completely wrap the data line 30, so that the shielding effect on the electric field of the data line 30 can be increased, and the influence of the electric field of the data line 30 on the liquid crystal can be weakened.

Illustratively, the aperture region corresponding to the sub-pixel is an actual light-transmitting region of the sub-pixel, and the non-aperture region corresponding to the sub-pixel is a non-light-transmitting region corresponding to the sub-pixel. In the liquid crystal display panel with a same size, the larger an area of the aperture region is, the higher the aperture ratio of the liquid crystal display panel is, and the better the display quality of the liquid crystal display panel is. The non-aperture region is located at the periphery of the aperture region. Illustratively, in the array substrate, the driving circuit corresponding to the sub-pixel is located in the non-aperture region corresponding to the sub-pixel, and both the gate line 10 and the data line 30 in the array substrate are located in the non-aperture region.

Illustratively, the array substrate includes a first indium tin oxide layer (1ITO layer) and a second indium tin oxide layer (2ITO layer), the 1ITO layer is located between the base substrate 60 and the 2ITO layer, the 1ITO layer includes a common electrode 20, and the 2ITO layer includes a pixel electrode 40.

In some examples, the array substrate further includes a plurality of touch electrode units correspondingly coupled to the touch signal lines 31. A layer, where the touch electrode unit is located, is on a side of the data line 30 away from the base substrate 60. An orthographic projection of a gap between two adjacent touch electrode units in the second direction on the base substrate 60 overlaps the orthographic projection of the data line 30 on the base substrate 60. The second direction is perpendicular to the first direction.

Illustratively, a touch electrode layer in the array substrate may be located in a touch region of the array substrate, the touch electrode layer includes a plurality of touch electrode units independent from each other, and the plurality of touch electrode units may be distributed in an array, but it is not limited thereto. The touch region may be divided into a plurality of touch sub-regions, and the touch electrode units are located in the touch sub-regions in a one-to-one correspondence. It should be noted that the specific position of the touch region may be set according to actual requirements. Illustratively, after the touch region and the array substrate form the liquid crystal display panel, the touch region coincides with the whole display region of the liquid crystal display panel; alternatively, the touch region is within the display region, and only coincides with a designated region in the display region.

Illustratively, each touch electrode unit is coupled to one corresponding touch signal line 31, and an end of the touch signal line 31 away from the touch electrode unit may be coupled to a chip subsequently bonded on the array substrate. After the array substrate and an opposite substrate 61 are aligned and assembled to form a liquid crystal display panel, when a touch operation occurs in a touch region of the liquid crystal display panel, the touch operation may change a touch signal formed in a touch electrode unit in the array substrate. Meanwhile, the touch signal line 31 is used for transmitting the touch signal acquired in the touch electrode unit to the chip, and the chip determines a specific touch position according to the touch signals received from the respective touch signal lines 31.

The touch signal line 31 is coupled to a corresponding touch electrode unit in the array substrate and a chip subsequently bonded on the array substrate. After the array substrate and an opposite substrate 61 are aligned and assembled to form a liquid crystal display panel, when a touch operation occurs in a touch region of the liquid crystal display panel, the touch operation may change a touch signal formed in a touch electrode unit in the array substrate. Meanwhile, the touch signal line 31 is used for transmitting the touch signal acquired in the touch electrode unit to the chip, and the chip determines a specific touch position according to the touch signals received from the respective touch signal lines 31.

In some embodiments, a layer, where the touch electrode unit is located, is between a layer, where the touch signal line 31 is located, and a layer where the data line 30 is located. Referring to FIG. 9, in the embodiment of the present disclosure, after the array substrate and the opposite substrate 61 are aligned and assembled to form the liquid crystal display panel, both of the touch electrode unit and the touch signal line 31 are located on a side of the data line 30 close to the light emitting surface of the liquid crystal display panel. The touch signal line 31 is coupled to a corresponding touch electrode, that is, the electric field states of the touch signal line 31 and the touch electrode are the same when the liquid crystal display panel is in an operating state. In this case, the touch electrode and the touch signal line 31 may be used together to shield the electric field of the data line 30, so that the region, where the data line 30 is located, is a dark region, thereby reducing the adverse effect on the liquid crystal deflection in the liquid crystal display panel and improving the aperture ratio of the liquid crystal display panel.

Optionally, in some embodiments, an orthographic projection of the touch electrode unit on the base substrate 60 partially overlaps an orthographic projection of the touch signal line 31 on the base substrate 60. In the embodiment of the present disclosure, when the orthographic projections of the touch electrode unit and the touch signal line 31 on the base substrate 60 overlap each other, the touch electrode unit and the touch signal line 31 jointly implement shielding, throughout the whole surface, the electric field of the data line 30 in the array substrate, so that the electric field of the data line 30 can be completely shielded to form a dark region, and light leakage of the liquid crystal display panel in the region, where the data line 30 is located, is avoided. Therefore, through such an arrangement, the pixel non-aperture region of the array substrate does not need to be shielded by a black matrix, thereby improving the aperture ratio of the liquid crystal display panel.

Optionally, in some embodiments, a length of an overlapping part between the orthographic projection of the touch electrode unit on the base substrate 60 and the orthographic projection of the touch signal line 31 on the base substrate 60 in the second direction is in a range of 1.5 to 3 micrometers. Referring to FIG. 9, in the second direction, i.e. in the width direction of the touch signal line 31, the width of the overlapping region between the touch electrode unit and the touch signal line 31 may be in a range of 1.5 to 3 micrometers. Specifically, in practical applications, the width may be adjusted according to a size of the display panel, and a specific size of the sub-pixel, for example, the width of the overlapping region between the touch electrode unit and the touch signal line 31 may be 2 micrometers.

Figure 6:
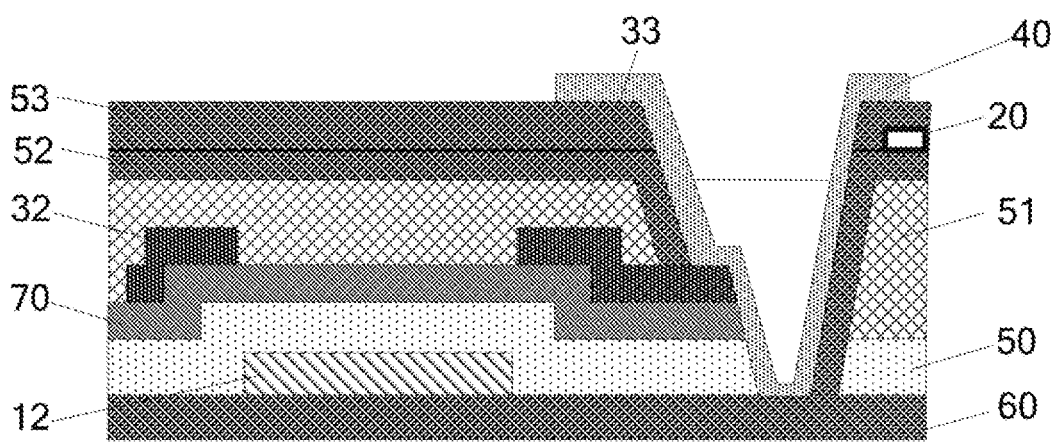
FIG. 6 is a schematic cross-sectional view taken along a line B1B2 in FIG. 1 or FIG. 4.

Optionally, in some embodiments, the array substrate further includes an organic insulating layer 51, which is arranged between the layer where the data line 30 is located and the layer where the touch electrode unit is located. Referring to FIGS. 5 to 6, in a direction perpendicular to the base substrate 60, the data line 30, the organic insulating layer 51, and the touch signal line 31 are sequentially stacked in a direction away from the base substrate 60.

Illustratively, the organic insulating layer 51 is thick and has a planarization effect.

At least a part of the above-described organic insulating layer 51 is located between the touch signal line 31 and the common electrode 20, so that a distance between the touch signal line 31 and the pixel electrode 40 is increased, which is beneficial to solve the problem that electric field formed between the touch signal line 31 and the pixel electrode 40 are asymmetric on left and right sides due to process fluctuation of the pixel electrode 40, the transmittance deviation among aperture regions is improved, the defects of different brightness and darkness in vision and black stain or white stain in vision, which are caused by the transmittance deviation, are better solved, and the yield of products is improved effectively.

In some embodiments, the array substrate further includes a plurality of gate lines 10, a plurality of data lines 30, and a plurality of sub-pixels. The plurality of gate lines 10 and the plurality of data lines 30 define the plurality of sub-pixel regions, and the plurality of sub-pixels are located in the plurality of sub-pixel regions correspondingly. The sub-pixel includes a pixel electrode 40 and a common electrode 20.

Illustratively, the data line 30 crosses the gate line 10. Illustratively, the data line 30 extends along the first direction, and the gate line 10 extends along the second direction. The array substrate may include a plurality of gate lines 10 and a plurality of data lines 30, the plurality of gate lines 10 and the plurality of data lines 30 are arranged to cross each other, a plurality of sub-pixel regions distributed in an array are defined on the base substrate 60, and the plurality of sub-pixels are located in the plurality of sub-pixel regions in a one-to-one correspondence.

Illustratively, the plurality of sub-pixels may include a plurality of sub-pixel columns arranged along the second direction, and each of the sub-pixel columns includes a plurality of sub-pixels arranged along the first direction.

Illustratively, the touch region of the array substrate is provided with a touch electrode layer, which includes a plurality of touch electrode units independent from each other, and the plurality of touch electrode units may be distributed in an array, but it is not limited thereto. The touch region may be divided into a plurality of touch sub-regions, and the touch electrode units are located in the touch sub-regions in a one-to-one correspondence. It should be noted that the specific position of the touch region may be set according to actual requirements. Illustratively, after the touch region and the array substrate form the liquid crystal display panel, the touch region coincides with the whole display region of the liquid crystal display panel; alternatively, the touch region is within the display region, and only coincides with a designated region in the display region.

Illustratively, each touch electrode unit is coupled to one corresponding touch signal line 31, and an end of the touch signal line 31 away from the touch electrode unit may be coupled to a chip subsequently bonded on the array substrate. After the array substrate and an opposite substrate 61 are aligned and assembled to form a liquid crystal display panel, when a touch operation occurs in the touch region of the liquid crystal display panel, the touch operation may change a touch signal formed in a touch electrode unit in the array substrate. Meanwhile, the touch signal line 31 is used for transmitting the touch signal acquired in the touch electrode unit to the chip, and the chip determines a specific touch position according to the touch signals received from the respective touch signal lines 31.

Illustratively, when arranging the touch signal line 31, the touch signal line 31 and the data line 30 may be arranged in different layers and insulated from each other on the base substrate 60, and the orthographic projection of the touch signal line 31 on the base substrate 60 overlaps the orthographic projection of the data line 30 in the array substrate on the base substrate 60. By such an arrangement, the problem of short circuit between the touch signal line 31 and the data line 30 does not need to be considered, so that the spacing between the touch signal line 31 and the data line 30 in the array substrate in the plane of the array substrate does not need to be particularly limited, and orthographic projections of the touch signal line 31 and the data line 30 on the base substrate 60 may even overlap each other. Therefore, through such an arrangement according to the present disclosure, an area of the non-aperture region at the periphery of the sub-pixel can be effectively reduced, thereby improving the pixel aperture ratio of the liquid crystal display panel formed by the array substrate by about 6%.

Furthermore, in the prior art, during an alignment process, a rubbing cloth is required to rub the alignment film along the direction perpendicular to the extending direction of the data line 30, so that when the rubbing cloth rubs near the data line 30 and the touch signal line 31, the rubbing cloth should climb up at the position of the data line 30, it is prone to cause a large alignment shadow (i.e., Rubbing Shadow) region (a width of the alignment shadow region in the prior art is about 6.5 μm) near the data line 30, where it is prone to generate a light leakage phenomenon. Therefore, the pixel non-aperture region is required to be shielded by a black matrix pattern on the opposite substrate 61 after the cell process. In the case where the touch signal line 31 is provided in the non-aperture region, when the array substrate and the opposite substrate 61 are aligned and assembled to form a cell, the assembly margin should be also considered from the touch signal line 31, and the area of the black matrix pattern on the opposite substrate 61 should be increased, that is, it will increase the width of the black matrix pattern in the direction perpendicular to the extending direction of the data line 30, which results in a decrease of the aperture ratio of the liquid crystal display panel. In the array substrate according to the embodiment of the present disclosure, by setting the orthographic projection of the touch signal line 31 on the base substrate 60 to partially overlap the orthographic projection of the data line 30 on the base substrate 60, when the array substrate and the opposite substrate 61 are aligned and assembled to form a cell, the width increase of the black matrix pattern in the direction perpendicular to the extending direction of the data line 30 caused by the factors based on the touch signal line 31 is reduced, so that the area of the black matrix pattern on the opposite substrate 61 can effectively reduced.

Illustratively, the sub-pixel includes a pixel electrode 40 and a common electrode 20, the pixel electrode 40 and the common electrode 20 are opposite to each other along a direction perpendicular to the base substrate 60, and the pixel electrode 40 is coupled to a driving circuit and receives an electrical signal provided by the driving circuit. The pixel electrode 40 and the common electrode 20 jointly form a driving electric field to drive liquid crystal in the liquid crystal display panel to deflect, so as to realize the display function of the liquid crystal display panel.

In some embodiments, the array substrate includes a plurality of touch sub-regions, and the touch electrode units are located in the touch sub-regions in a one-to-one correspondence. Each touch sub-region corresponds to multiple sub-pixel regions. The common electrodes 20 of the sub-pixels located in the same touch sub-region are coupled together, and the coupled common electrodes 20 also serve as the touch electrode unit in the touch sub-region.

In the array substrate according to the embodiment of the present disclosure, the common electrodes 20 located in the same touch sub-region may also serve as the touch electrode unit in the touch sub-region, so that the touch electrode unit does not need to be additionally formed in the array substrate. Moreover, the common electrodes 20 located in the same touch sub-region are coupled together, so that the resistance of the common electrodes 20 is relatively low, and the generated loss is relatively small. Therefore, when the common electrodes 20 located in the same touch sub-region also serve as the touch electrode unit in the touch sub-region, the resistance of the touch electrode unit is relatively low, so that the loss on the touch signal line 31 is can effectively reduced, the touch sensitivity can be improved, and the product competitiveness and the added value (i.e., touch function) can be improved as a whole.

Figure 2:
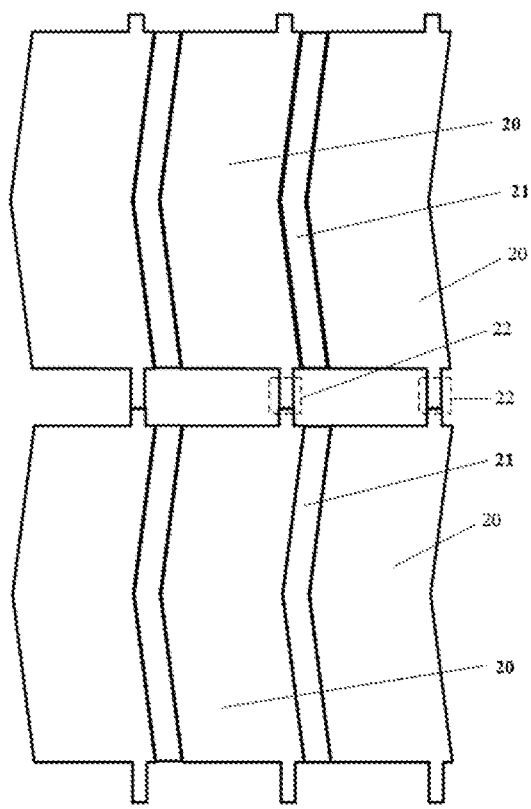
FIG. 2 is a schematic diagram illustrating a layout of a plurality of common electrodes located in a same touch sub-region in an array substrate according to an embodiment of the present disclosure.
Figure 3:
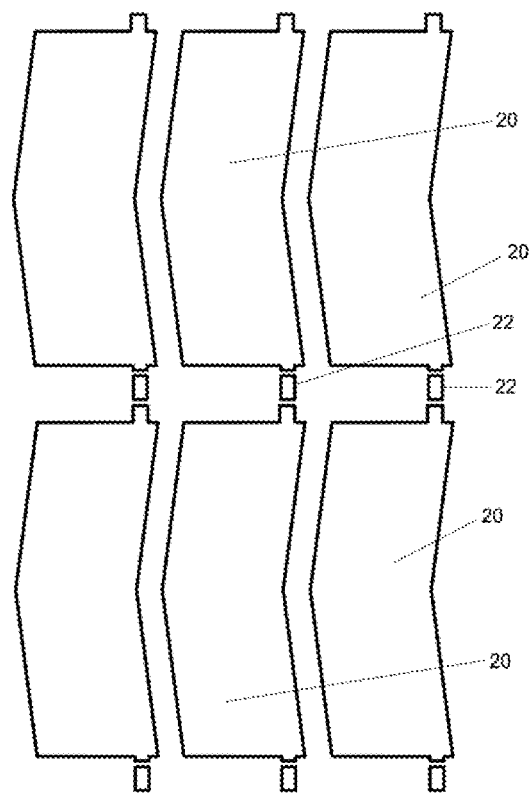
FIG. 3 is a schematic diagram illustrating a layout of a plurality of common electrodes located in different touch sub-regions in an array substrate according to an embodiment of the present disclosure.

Illustratively, referring to FIGS. 1 and 2, in an embodiment of the present disclosure, multiple common electrodes 20 located in the same touch sub-region may be coupled together through a connection part. Specifically, among the multiple common electrodes 20 located in the same touch sub-region, two adjacent common electrodes of the multiple of common electrodes 20 arranged along the second direction (row direction) are connected through a first connection part 21 located between the two adjacent common electrodes 20, and may be connected into a one-piece structure; the multiple common electrodes 20 arranged along the second direction may be connected together through at least one second connection part 22. Meanwhile, referring to FIG. 3, in the second direction, the first connection part 21 is not arranged between the common electrodes 20 in different touch sub-regions, so that the common electrodes 20 are disconnected from each other; in the first direction, the common electrodes 20 located in different touch sub-regions are disconnected from the second connection part 22, thereby achieving disconnection between the common electrodes 20. Illustratively, the common electrode 20 may be coupled to the touch signal line 31 through the first connection part 21. Specifically, an orthographic projection of the first connection part 21 on the base substrate overlaps an orthographic projection of a first part of a first connection via Via1 on the base substrate, and the first part of the first connection via Via1 exposes the first connection part 21; an orthographic projection of a second part of the first connection via Via1 on the base substrate overlaps an orthographic projection of a part of the pattern of the touch signal line 31 on the base substrate, and the second part of the first connection via Via1 exposes the part of the touch signal line 31.

Illustratively, the first connection part 21 and the second connection part 22 may be arranged in the same layer and made of a same material as the common electrode 20. That is, the first connection part 21, the second connection part 22 and the common electrode 20 may be formed in one same patterning process, thereby simplifying a manufacturing process of the array substrate and reducing a manufacturing cost of the array substrate.

Under the condition that the common electrodes 20 in the same touch sub-region also serve as the touch electrode unit in the touch sub-region, after the liquid crystal display panel is formed using the array substrate, the specific process of realizing the touch display function with the liquid crystal display panel is as follows.

In a touch stage, the touch signal line 31 provides a touch signal to the coupled common electrodes 20 (i.e., the touch electrode unit), when a touch operation occurs in the touch region of the liquid crystal display panel, the touch signal corresponding to the touch electrode unit at the position, where the touch operation occurs, changes, and the touch electrode unit transmits the changed touch signal to the chip through the corresponding touch signal line 31, and the chip determines the specific position where the touch operation occurs based on the changed touch signal.

In a display stage, the touch signal line 31 provides a common electrode signal required for display to the coupled common electrode 20, and simultaneously, the sub-pixel driving circuit in the array substrate provides a driving signal to the corresponding pixel electrode 40, so that an electric field for driving liquid crystal to deflect is generated between the pixel electrode 40 and the common electrode 20, and the liquid crystal display panel achieves a display function.

In some embodiments, the array substrate further includes a first passivation layer 52. The layer where the common electrode 20 is located, the first passivation layer 52, the layer where the touch signal line 31 is located, and the layer where the pixel electrode 40 is located, are sequentially arranged in the direction away from the base substrate 60. The common electrode 20 is coupled to the touch signal line 31 through the first connection via Via1, and the first connection via Via1 penetrates through at least the first passivation layer 52. As an implementation, the first connection via Via1 is formed directly in the first passivation layer 52, and the touch signal line 31 may be directly connected to the common electrode 20 through the first connection via Via1.

In some embodiments, the array substrate further includes a second passivation layer 53, which is located on a side of the layer, where the touch signal line 31 is located, away from the base substrate 60. The first connection via Via1 includes: a first part, which penetrates through the first passivation layer 52, the layer where the touch signal line 31 is located, and the second passivation layer 53, and exposes at least a part of the common electrode 20; and a second part, which penetrates through the second passivation layer 53 and exposes at least a part of the touch signal. The array substrate further includes a first connection pattern 42, and an orthographic projection of the first connection pattern 42 on the base substrate 60 covers orthographic projections of the first part and the second part of the first connection via Via1 on the base substrate 60, so that the first connection pattern 42 couples the common electrode 20 and the touch signal line 31 together. Referring to FIG. 5, at least a part of the second passivation layer 53 is located between the touch signal line 31 and the pixel electrode 40. In this embodiment, the touch signal line 31 may be connected to the common electrode 20 through the first connection pattern 42. An orthographic projection of the first connection pattern 42 on the base substrate 60 covers orthographic projections of the first part and the second part of the first connection via Via1 on the base substrate 60. In the embodiment of the present disclosure, during the manufacturing process of the array substrate, the first passivation layer 52 and the second passivation layer 53 may be etched at the same time through one patterning process, to remove parts of the first passivation layer 52 and the second passivation layer 53 located above at least a part of the common electrode 20 (corresponding to the first part of the first via) and to remove a part of the second passivation layer 53 located above at least a part of the touch signal line 31 (corresponding to the second part of the first via), so that the first via penetrating through the first passivation layer 52 and the second passivation layer 53 is formed, and at least a part of the common electrode 20 and at least a part of the touch signal line 31 are exposed. That is, based on this arrangement, a separate etching step for the first passivation layer 52 may be omitted, and one mask process is saved, thereby simplifying the manufacturing process of the array substrate and saving the manufacturing cost of the array substrate.

In some embodiments, the first connection pattern 42 is arranged in the same layer and made of the same material as the pixel electrode 40. The first connection pattern 42 and the pixel electrode 40 are arranged in the same layer and made of the same material, so that the first connection pattern 42 and the pixel electrode 40 can be formed in one same patterning process, which is favorable for simplifying the manufacturing process flow of the array substrate, and reducing the manufacturing cost of the array substrate. Referring to FIG. 5, the first connection pattern 42 couples the common electrode 20 and the corresponding touch signal line 31 through the first and second parts of the first via.

In some embodiments, the sub-pixel further includes a driving circuit, and at least a part of the output electrode 33 of the driving circuit is located on one side of the organic insulating layer 51 close to the base substrate 60. The pixel electrode 40 is coupled to the output electrode 33 through a second connection via Via2, and the second connection via Via2 penetrates through at least the organic insulating layer 51, the first passivation layer 52, and the second passivation layer 53 to expose the output electrode 33 of the driving circuit, so that the pixel electrode 40 is coupled to the output electrode 33.

Illustratively, the driving circuit includes a thin film transistor, the gate 12 of the thin film transistor is coupled to a corresponding gate line 10, the input electrode of the thin film transistor is coupled to a corresponding data line 30, the output electrode 33 of the thin film transistor serves as the output electrode 33 of the driving circuit, and the output electrode 33 is coupled to the pixel electrode 40. Illustratively, the output electrode 33 includes the source 32 of the thin film transistor.

Illustratively, the output electrode 33 is arranged in the same layer and made of the same material as the data line 30 and the touch signal line 31. The gate insulating layer 50, the output electrode 33, the organic insulating layer 51, the common electrode 20, the first passivation layer 52, and the pixel electrode 40 are sequentially stacked in a direction away from the base substrate 60.

In some examples, the drive circuit includes a driving transistor. The second connection via Via2 includes a first sub-via and a second sub-via. The first sub-via penetrates through the organic insulating layer 51, the second sub-via penetrates through the first passivation layer 52 and the second passivation layer 53, and an orthographic projection of the first sub-via on the base substrate 60 includes an orthographic projection of the second sub-via on the base substrate 60. The pixel electrode 40 is coupled to the output electrode 33 through the second sub-via.

Illustratively, after the organic insulating layer 51 is formed, a patterning process is performed to form a via in the organic insulating layer 51, and the gate insulating layer 50 is continuously etched in the via, so as to form a first sub-via penetrating through the organic insulating layer 51 and the gate insulating layer 50. Then, a first passivation layer 52 is formed, and a next patterning process is performed to pattern the first passivation layer 52 to form a second sub-via penetrating through the first passivation layer 52. It should be noted that a part of the first passivation layer 52 is located in the first sub-via, and is etched to form the second sub-via. An orthographic projection of the first sub-via on the base substrate 60 surrounds an orthographic projection of the second sub-via on the base substrate 60, so as to form a via-in-via. Then, the pixel electrode 40 is formed, and the pixel electrode 40 is coupled to the output electrode 33 through the first and second sub-vias.

It should be noted that, in the case where the orthographic projection of the first sub-via on the base substrate 60 is arranged to surround the orthographic projection of the second sub-via on the base substrate 60, if the orthographic projection of the boundary of the via on the base substrate 60 does not overlap the orthographic projection of the output electrode 33 on the base substrate 60, when the gate insulating layer 50 is subsequently etched, an over-etching problem may occur. That is, a part of the gate insulating layer 50 under the edge of the output electrode 33 exposed by the via is etched to form an undercut, so that the part of the gate insulating layer 50 under the edge of the output electrode 33 has a notch recessed towards a space under the output electrode 33, and the pixel electrode 40 formed subsequently is prone to break at the notch, thereby causing an open circuit between the pixel electrode 40 and the driving circuit, so that the driving circuit cannot provide a signal to the pixel electrode 40.

In the display substrate according to the above embodiment, by setting that the orthographic projection of the boundary of the first sub-via on the base substrate 60 at least partially overlaps the orthographic projection of the output electrode 33 on the base substrate 60, at least a part of the boundary of the first sub-via may be located on the output electrode 33, and then at least a part of the boundary of the second sub-via may be controlled to be located on the output electrode 33, so that the pixel electrode 40 can be prevented from being completely disconnected from the output electrode 33 at the boundary of the output electrode 33, and good connection performance between the pixel electrode 40 and the output electrode 33 is ensured.

Figure 4:
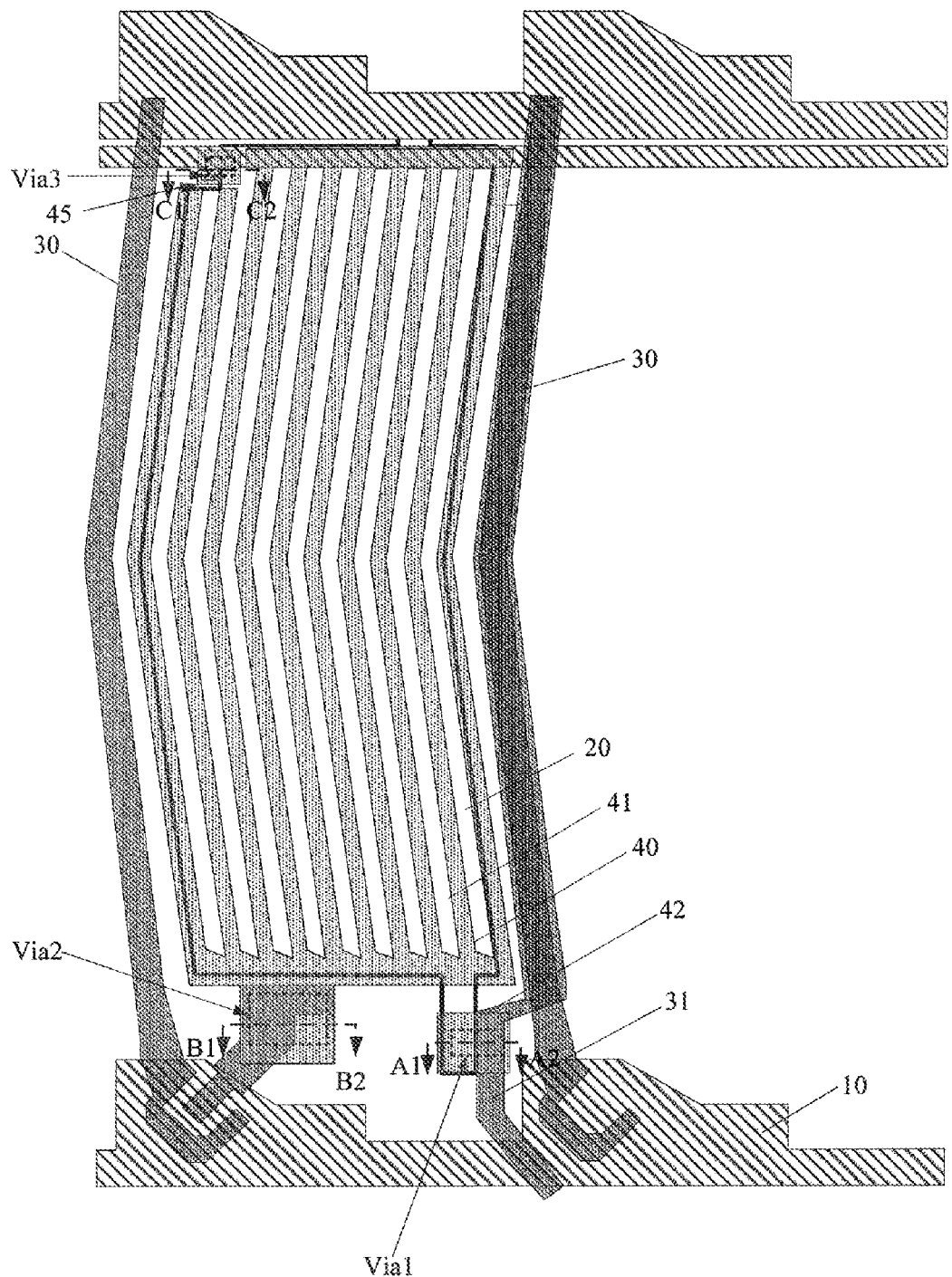
FIG. 4 is a schematic diagram illustrating a second layout of a sub-pixel according to an embodiment of the present disclosure.

In some embodiments, referring to FIG. 4, the array substrate further includes: an auxiliary electrode 13, which is located between two sub-pixel regions adjacent in the first direction and extends in the second direction. A plurality of common electrodes 20 located in the same touch sub-region are coupled together through the auxiliary electrode 13. The auxiliary electrode 13 has a conductivity greater than that of the common electrode 20. In the embodiment of the present disclosure, the auxiliary electrode 13 may be arranged in the non-aperture region between the adjacent sub-pixel regions, and the auxiliary electrode 13 is coupled to the common electrode 20, so that the resistance of the common electrodes 20 located in the same touch sub-region is relatively low, the loss on the touch signal line 31 is effectively reduced, the touch sensitivity is improved, and the product competitiveness and the added value (i.e., touch function) are improved as a whole.

Illustratively, the material of the common electrode 20 may include ITO, and the material of the auxiliary electrode 13 may include a conductive metal. Typically, the sheet resistance of ITO is 30 Ω/square and the sheet resistance of a conductive metal is 0.01 Ω/square. That is, the resistivity of a conductive metal is much lower than the resistivity of ITO. Thus, by coupling the common electrodes 20 in the same touch sub-region through the auxiliary electrode 13, the overall resistance of the common electrode 20 in the array substrate can be greatly reduced, and the resistance uniformity of the common electrodes 20 in the same touch sub-region is improved.

Figure 7:
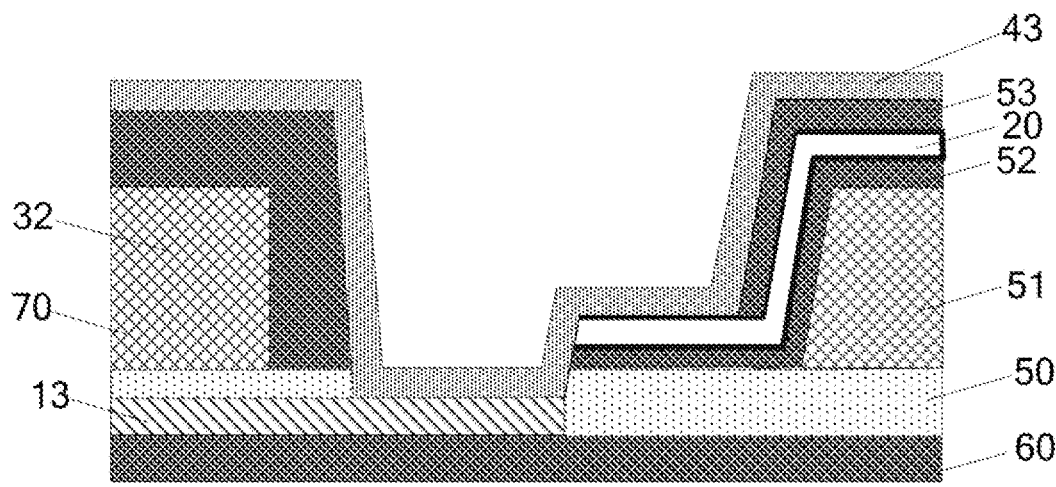
FIG. 7 is a schematic cross-sectional view taken along a line C1C2 in FIG. 4.
Figure 8:
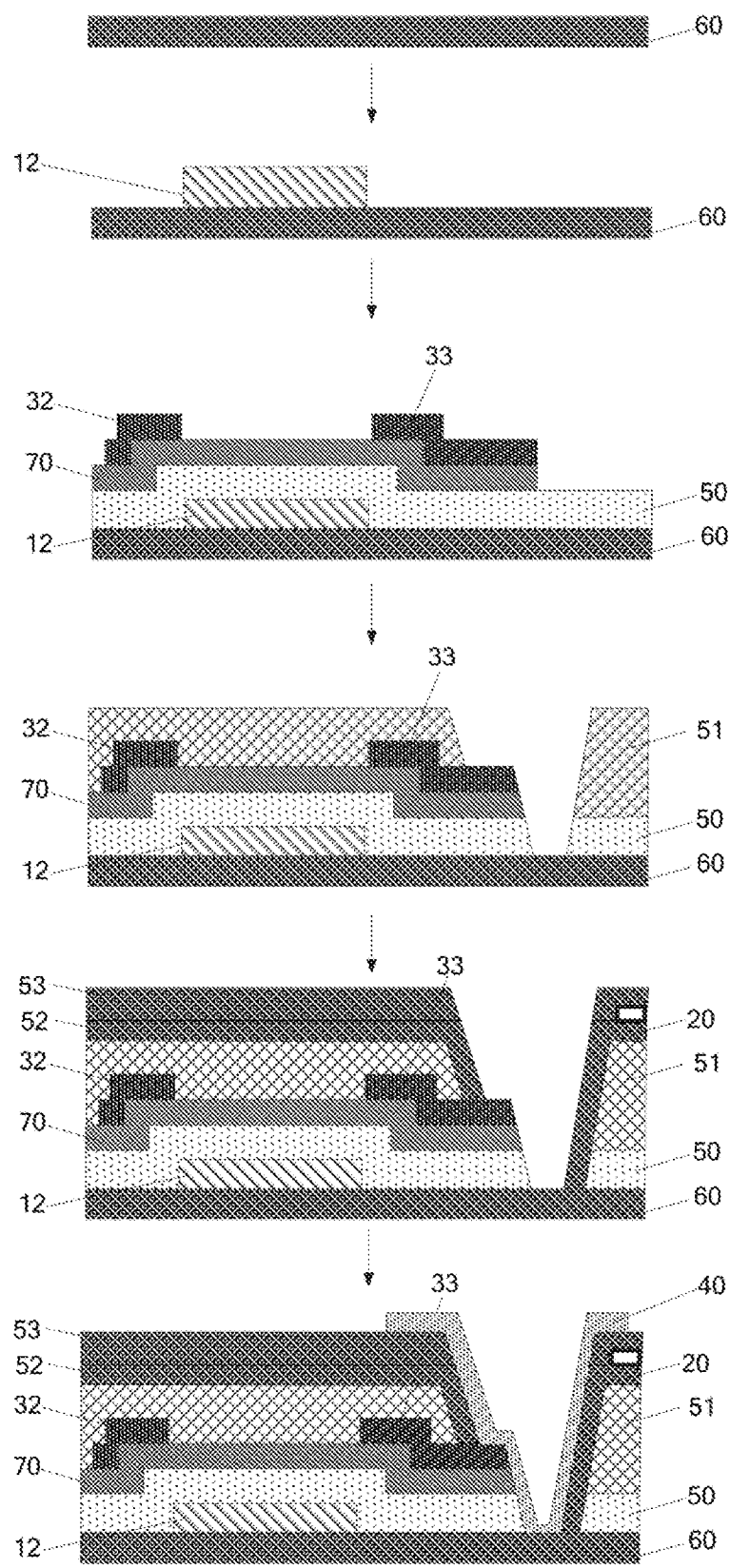
FIG. 8 is a schematic diagram illustrating a connection between an output electrode and a pixel electrode according to an embodiment of the present disclosure.

Illustratively, referring to FIG. 7, the array substrate further includes a gate insulating layer 50, a third connection via Via3, and a second connection pattern 43. At least a part of the gate insulating layer 50 is located on a side of the auxiliary electrode 13 away from the base substrate 60. The third connection via Via3 includes a third sub-via and a fourth sub-via, the third sub-via penetrates through the organic insulating layer 51, and the fourth sub-via penetrates through the second passivation layer 53 and the first passivation layer 52, exposing the auxiliary electrode 13 and the common electrode 20. An orthographic projection of the third sub-via on the base substrate 60 includes an orthographic projection of the fourth sub-via on the base substrate 60. An orthographic projection of the second connection pattern 43 on the base substrate 60 covers an orthographic projection of the fourth sub-via on the base substrate 60, so that the second connection pattern 43 couples the auxiliary electrode 13 and the common electrode 20 together.

Illustratively, the plurality of sub-pixels include a plurality of red sub-pixels, a plurality of green sub-pixels, and a plurality of blue sub-pixels. At least one red sub-pixel (R), at least one green sub-pixel (G), and at least one blue sub-pixel (B) constitute one pixel unit. Optionally, In the array substrate according to the embodiment of the present disclosure, the third connection via Via3 may be arranged in the blue sub-pixel region, and has no influence on the overall transmittance. Taking a 23.8" FIC (full In cell) display panel as an example, the aperture ratios are 64% (R and G) and 62.9% (B). Compared with the conventional product with the aperture ratio of 50.6%, the aperture ratio is increased by 26.4%, and similarly, the transmittance is also increased by more than 20%.

Illustratively, the auxiliary electrode 13 is insulated from the gate line 10, and is arranged in the same layer and made of the same material as the gate line 10. The auxiliary electrode 13 and the gate line 10 are arranged in the same layer and made of the same material, so that the auxiliary electrode 13 and the gate line 10 can be formed in the same patterning process, which is favorable for simplifying the manufacturing process flow of the array substrate, and reducing the manufacturing cost of the array substrate.

When the array substrate according to the above embodiments is used to manufacture a liquid crystal display panel, the following processes are generally included.

Firstly, an array substrate and an opposite substrate 61 are formed. A driving circuit layer, a layer of common electrode 20, a layer of pixel electrode 40 and a first alignment film are formed on the array substrate. The driving circuit layer includes: driving circuits which are in one-to-one correspondence with sub-pixels in the liquid crystal display panel; and signal lines used for providing various signals to the driving circuits. The signal lines include a plurality of gate lines 10 and a plurality of data lines 30, and the gate lines 10 and the data lines 30 are arranged to cross each other to define a plurality of sub-pixels. The layer of pixel electrode 40 includes pixel electrodes 40 in a one-to-one correspondence with the sub-pixels, and each pixel electrode 40 is electrically connected to the output electrode 33 of the driving transistor in the corresponding driving circuit. The first alignment film covers the driving circuit layer, the layer of common electrode 20, and the layer of pixel electrode 40, and the first alignment film is rubbed using a rubbing cloth to form a first alignment layer having a groove in a fixed direction. The opposite substrate 61 is provided with color filter units in a one-to-one correspondence with the sub-pixels, a black matrix pattern located at the peripheries of respective color filter units, and a second alignment film covering the color filter units and the black matrix pattern. The second alignment film is rubbed using a rubbing cloth to form a second alignment layer having a groove in a fixed direction.

After the first alignment layer and the second alignment layer are formed, the array substrate and the opposite substrate 61 are aligned and assembled to form a cell, such that both of the first alignment layer and the second alignment layer are located in the cell after the cell process. In the direction perpendicular to the base substrate 60 of the array substrate, the color filter units are opposite to the aperture regions of the corresponding sub-pixels, and the black matrix pattern may shield the non-aperture regions at the peripheries of the respective sub-pixels.

Finally, liquid crystal molecules are injected into the liquid crystal cell formed by the array substrate and the opposite substrate 61, and the liquid crystal molecules can be aligned in the direction of the grooves in the first alignment layer and the second alignment layer.

In order to improve the transmittance of the liquid crystal display panel, in the present disclosure, when manufacturing the liquid crystal display panel, the liquid crystal display panel may adopt different display modes. General display modes include an Advanced Super Dimension Switch (ADS) display mode. In an example, in the ADS display mode, each pixel electrode 40 in the liquid crystal display panel is designed to have a slit 41, and an extending direction of the slit 41 is set to be perpendicular to an extending direction of the data line 30.

In the ADS display mode described above, in order to ensure the normal display function of the liquid crystal display panel, it is necessary to set the extending direction of the grooves on the alignment layer to be the same as the extending direction of the slits 41. That is, during the alignment process, the rubbing cloth is required to rub the alignment film along the direction perpendicular to the extending direction of the data lines 30, so that when the rubbing cloth rubs near the data lines 30, the rubbing cloth should climb up at the position of the data lines 30, it is prone to cause a large alignment shadow (i.e., Rubbing Shadow) region near the data line 30. Since the light leakage phenomenon is prone to occur in this region, this region is required to be shielded by the black matrix pattern on the opposite substrate 61 after the cell process, which increases the width of the black matrix pattern in the direction perpendicular to the extending direction of the data lines 30, and reduces the aperture ratio of the liquid crystal display panel.

Based on the above problems, inventors of the present disclosure have found through research that, by changing the extending direction of the slit 41 to be the same as the extending direction of the data line 30, and making the groove direction of the alignment layer after alignment process is the same as the extending direction of the data line 30, in the alignment process, an alignment shadow region can be prevented from being formed near the data line 30, thereby reducing the width of the black matrix pattern for shielding the data line 30 in the direction perpendicular to the extending direction of the data line 30, and effectively improving the aperture ratio of the liquid crystal display panel.

As shown in FIGS. 1 and 4, in some embodiments, the pixel electrode 40 has a plurality of slits 41, and at least a part of the slits 41 extending in the first direction.

Illustratively, each sub-pixel includes a pixel electrode 40, the pixel electrode 40 may be made of an indium tin oxide material, and during the manufacturing process, a plurality of slits 41 may be formed through a patterning process, and an extending direction of the slits 41 is the same as an extending direction of the data line 30, so as to implement a vertical ADS (i.e., H-ADS) design. Each pixel electrode 40 is electrically connected to the output electrode 33 of the driving transistor in the corresponding sub-pixel driving circuit, and receives a driving signal provide by the driving transistor.

The process of forming the alignment layer on the array substrate includes the following steps.

An alignment material film is first formed on the array substrate on the side where the pixel electrode 40 is arranged, and then rubbing alignment is performed using a rubbing cloth along the extending direction of the slit 41 in the pixel electrode 40 (i.e., the extending direction of the data line 30), so as to form an alignment layer having a groove, which extends in the same direction as the extending direction of the slit 41.

According to the specific structure of the array substrate described above, in the array substrate in the embodiment of the present disclosure, the extending direction of the slit 41 in each pixel electrode 40 is the same as the extending direction of the data line 30, so that a large rubbing shadow region is not formed near the data line 30 during the process of rubbing the alignment material film on the array substrate. As shown in FIG. 9, when the array substrate and the opposite substrate 61 according to the above embodiment are aligned and assembled to form a liquid crystal display panel, the width of the black matrix pattern BM in the opposite substrate 61 for shielding the data line 30 in the direction parallel to the base substrate 60 and perpendicular to the extending direction of the data line 30 can be reduced, thereby effectively improving the aperture ratio of the liquid crystal display panel.

Illustratively, when the alignment material film is rubbed on the array substrate, an included angle between the alignment direction and the extending direction of the slit 41 is in a range of 7° to 11°, and the two endpoint values may be adopted.

Illustratively, the array substrate according to the embodiment of the present disclosure further includes a black matrix pattern BM. The orthographic projection of the black matrix pattern BM on the base substrate 60 covers the orthographic projection of the touch signal line 31 on the base substrate 60.

Illustratively, in a direction parallel to the base substrate 60 and perpendicular to the extending direction of the touch signal line 31, the boundary of the orthographic projection of the black matrix pattern BM on the base substrate 60 exceeds the boundary of the orthographic projection of the touch signal line 31 on the base substrate 60 by 1.9 micrometers to 2.3 micrometers, where the two endpoint values may be adopted. Illustratively, as shown in FIG. 9, the exceeding value is 2.1 micrometers.

Note that the units of the numbers for marking distances in FIG. 9 are micrometers.

In more detail, in a case where the data line 30 generates a rubbing shadow region, and the touch signal line 31 is arranged in a non-aperture region side by side with the corresponding data line 30, a width of a region to be shielded at the data line 30 in a direction perpendicular to the extending direction of the data line 30 may reach about 8.5 um, thereby causing a loss of about 3% of the aperture ratio. Therefore, in the array substrate according to the above embodiment, by setting the extending direction of the slit 41 in the pixel electrode 40 to be the same as the extending direction of the data line 30, and arranging the touch signal line 31 and the data line 30 on the base substrate 60 in different layers and insulated from each other, both of the generation of a rubbing shadow region and the requirements to consider the assembly margin and the short circuit condition from the touch signal line 31, are avoided, so as to reduce the width of the region to be shielded at the data line 30 in the extending direction perpendicular to the data line 30, so that when the array substrate is formed into a liquid crystal display panel, the pixel aperture ratio of the liquid crystal display panel can be improved by about 3%.

Through arranging the array substrate according to the manner described above, it is beneficial to improve the operating stability of the array substrate, and reduce the arrangement difficulty of the array substrate in a limited arrangement space.

An embodiment of the present disclosure further provides a display apparatus, which includes the array substrate according to the above embodiment.

It should be noted that the display apparatus may be any product or component with a display function, such as a liquid crystal display panel, a television, a monitor, a digital photo frame, a mobile phone, an electronic paper, a tablet computer, a notebook computer, a digital photo frame, a navigator, or the like.

In the array substrate according to the above embodiment, the touch signal line 31 and the data line 30 are arranged in different layers and insulated from each other, so that the problem of short circuit between the data line 30 and the touch signal line 31 does not need to be considered. That is, a spacing between the touch signal line 31 and the data line 30 in the plane of the array substrate does not need to be particularly limited. Therefore, compared with the prior art, limitation on the size of the non-aperture region between adjacent sub-pixel columns due to the touch signal line 31 and the data line 30 can be reduced, thereby improving the aperture ratio of the liquid crystal display panel. In addition, in the array substrate manufactured through the manufacturing method according to the embodiment of the present disclosure, by setting the orthographic projection of the touch signal line 31 on the base substrate 60 to partially overlap the orthographic projection of the data line 30 on the base substrate 60, when the array substrate and the opposite substrate 61 are aligned and assembled to form a cell, the width increase of the black matrix pattern in the direction perpendicular to the extending direction of the data line 30 caused by the factors based on the touch signal line 31 is reduced, so that the area of the black matrix pattern on the opposite substrate 61 can effectively reduced.

Therefore, under the condition that the display apparatus according to the embodiment of the present disclosure includes the array substrate described above, the display apparatus has the same beneficial effects described above, which are not repeated here.

The embodiment of the present disclosure further provides a manufacturing method of an array substrate, and the manufacturing method includes the following steps.

Forming a data line 30 and a touch signal line 31 on a base substrate 60.

The data lines 30 extends in a first direction.

The extending direction of the touch signal line 31 is the same as the extending direction of the data line 30; the data line 30 and the touch signal line 31 are in arranged in different layers and insulated from each other, and the orthographic projection of the touch signal lines 31 on the base substrate 60 at least partially overlaps the orthographic projection of the data lines 30 on the base substrate 60.

In the array substrate manufactured through the manufacturing method according to the embodiment of the present disclosure, the touch signal line 31 and the data line 30 are arranged in different layers and insulated from each other, so that the problem of short circuit between the data line 30 and the touch signal line 31 does not need to be considered. That is, a spacing between the touch signal line 31 and the data line 30 in the plane of the array substrate does not need to be particularly limited. Therefore, compared with the prior art, limitation on the size of the non-aperture region between adjacent sub-pixel columns due to the touch signal line 31 and the data line 30 can be reduced, thereby improving the aperture ratio of the liquid crystal display panel. In addition, in the array substrate manufactured through the manufacturing method according to the embodiment of the present disclosure, by setting the orthographic projection of the touch signal line 31 on the base substrate 60 to partially overlap the orthographic projection of the data line 30 on the base substrate 60, when the array substrate and the opposite substrate 61 are aligned and assembled to form a cell, the width increase of the black matrix pattern in the direction perpendicular to the extending direction of the data line 30 caused by the factors based on the touch signal line 31 is reduced, so that the area of the black matrix pattern on the opposite substrate 61 can be effectively reduced.

In some embodiments, the manufacturing method includes the following steps.

Forming a gate line 10 and an auxiliary electrode 13 on a base substrate 60; the auxiliary electrode 13 and the gate line 10 extend in the second direction; the auxiliary electrode 13 is used for subsequent coupling with the common electrode 20 to reduce the transmission resistance of the common electrode 20.

In more detail, a first gate metal layer is formed on a base substrate 60, and the first gate metal layer includes a first molybdenum metal layer, a first aluminum metal layer, and a second molybdenum metal layer, which are sequentially stacked in a direction away from the base substrate 60. A thickness of the first molybdenum metal layer is 150 Å (angstrom), a thickness of the first aluminum layer is 3000 Å, and a thickness of the second molybdenum metal layer is 800 Å. A patterning process is performed on the first gate metal layer, and the patterning process sequentially includes processes of coating photoresist, exposing, developing, wet etching, and the like, to form the gate line 10 and the auxiliary electrode 13.

Forming a driving circuit, and a data line 30 on the base substrate 60 on which the gate line 10 and the auxiliary electrode 13 are formed.

In more detail, in this step, an entire layer of a gate insulating layer 50 is deposited first, and the gate insulating layer 50 covers the gate line 10 and the auxiliary electrode 13. A material of the gate insulating layer 50 includes silicon nitride. A thickness of the gate insulating layer 50 is 4000 Å.

The active layer 70 and the source/drain metal layer of the thin film transistor are formed through an SSM (Single Slit Mask) process (i.e., a 4Mask process). A thickness of the active layer 70 is 1700 Å. The source/drain metal layer includes a third molybdenum metal layer, a second aluminum metal layer, and a fourth molybdenum metal layer, which are sequentially stacked in the direction away from the base substrate 60. A thickness of the third molybdenum metal layer is 150 Å, a thickness of the second aluminum metal layer is 3000 Å, and a thickness of the fourth molybdenum metal layer is 800 Å. A patterning process is performed on the source/drain metal layer, and the patterning process sequentially includes processes of coating photoresist, exposing, developing, wet etching, and the like, to form an input electrode and an output electrode 33 of the driving circuit and the data line 30.

Forming an organic insulating layer 51 on the base substrate 60 on which the driving circuit is formed, where the organic insulating layer 51 covers the output electrode 33 of the driving circuit and the data line 30.

In more detail, in the embodiment of the present disclosure, a buffer layer may be formed by depositing silicon nitride material, and a thickness of the buffer layer is 1000 Å. An entire layer of an organic insulating layer 51 is subsequently deposited on the side of the buffer layer away from the base substrate 60 using an organic resin, and a thickness of the organic insulating layer 51 is 20000 Å.

Forming a first sub-via and a third sub-via in one patterning process; the first sub-via penetrates through the organic insulating layer 51 and exposes at least a part of the output electrode 33 of the driving circuit; the third sub-via penetrates through the organic insulating layer 51 and exposes the auxiliary electrode 13.

In more detail, in this step, one patterning process is performed on the organic insulating layer 51 to form an via penetrating through the organic insulating layer 51 and the buffer layer, and the gate insulating layer 50 is continuously etched in the via to form a first sub-via penetrating through the organic insulating layer 51 and the gate insulating layer 50.

Forming a Common Electrode 20.

In more detail, in this step, an indium tin oxide material may be used to form a 1ITO layer, where a thickness of the 1ITO layer is 700 Å. A patterning process is performed on the 1ITO layer, and the patterning process sequentially includes processes of coating photoresist, exposing, developing, wet etching, and the like, to form the common electrode 20, and the common electrode 20 is coupled to the corresponding first connection pattern 42 through a third connection via Via3.

Forming a first passivation layer 52, where the first passivation layer 52 covers the common electrode 20.

In more detail, in this step, a silicon nitride material is used to deposit and form an entire layer of the first passivation layer 52. A thickness of the first passivation layer 52 is 2500 Å.

Forming a Touch Signal Line 31.

In more detail, in this step, Mo is used to form the film layer of touch signal line 31 (TPM). A thickness of the film layer of the touch signal line 31 is 2500 Å. A patterning process is performed on the film layer of the touch signal line 31, and the patterning process sequentially includes processes of coating photoresist, exposing, developing, wet etching, and the like, to form the touch signal line 31. The touch signal line 31 includes a first connection pattern 42 for being coupled to the 1ITO layer.

Forming a second passivation layer, where the second passivation layer 53 covers the touch signal line 31;

In more detail, in this step, a silicon nitride material is used to deposit and form an entire layer of the second passivation layer 52. A thickness of the second first passivation layer 52 is 4000 Å.

Patterning the second passivation layer 53 to form a second sub-via, a fourth sub-via, and a first connection via Via1.

In more detail, in this step, one patterning process is performed on the second first passivation layer 52, and the second first passivation layer 52 is patterned to form the second sub-via, the fourth sub-via and the first connection via Via1 that penetrate through the first passivation layer 52. The second sub-via penetrates through the first passivation layer 52 and the second passivation layer 53, and an orthographic projection of the first sub-via on the base substrate 60 includes an orthographic projection of the second sub-via on the base substrate 60. The fourth sub-via penetrates through the second passivation layer 53 and the first passivation layer 52 to expose the auxiliary electrode 13 and the common electrode 20, and an orthographic projection of the third sub-via on the base substrate 60 includes an orthographic projection of the fourth sub-via on the base substrate 60. The first connection via Via1 includes: a first part, which penetrates through the first passivation layer 52 and the second passivation layer 53, and exposes at least a part of the common electrode 20; and a second part, which penetrates through the second passivation layer 53, and exposes at least a part of the touch signal line.

Forming a pixel electrode 40, a first connection pattern 42, and a second connection pattern 43, where the pixel electrode 40 is coupled to the output electrode 33 through the second connection via Via2, the first connection pattern 42 is coupled to the corresponding touch signal line 31 through the first connection via Via1, and the second connection pattern 43 couples the auxiliary electrode 13 to the common electrode 20 through the fourth sub-via.

In more detail, in this step, an indium tin oxide material is used to form a 2ITO layer, and a thickness of the 2ITO layer is 700 Å. A patterning process is performed on the 2ITO layer, and the patterning process sequentially includes processes of coating photoresist, exposing, developing, wet etching, and the like, to form the pixel electrode 40, the second connection pattern 43, and the first connection pattern 42. The pixel electrode 40 is coupled to the output electrode 33 of the driving circuit through the second connection via Via2 (specifically, the second sub-via), and the first connection pattern 42 couples the common electrode 20 to the corresponding touch signal line 31 through the first connection via Via1. The second connection pattern 43 couples the auxiliary electrode 13 and the common electrode 20 together through the fourth sub-via.

It should be noted that, in the present disclosure, relational terms such as first and second, and the like are only used to distinguish one entity or operation from another entity or operation, and do not necessarily require or imply any such actual relationship or order between such entities or operations. Moreover, the terms "comprises (includes)", "comprising (including)", or any other variation thereof, are intended to encompass a non-exclusive inclusion, such that a process, method, article, or device that includes a list of elements include those elements and may include other elements not expressly listed or inherent to such process, method, article, or device. Without further limitation, an element "comprising (including) a/an" does not exclude the presence of additional identical elements in the process, method, article, or device that includes the element.

Embodiments in accordance with the present disclosure are described above, but these embodiments do not exhaust all the details and do not limit the present disclosure to only the specific embodiments. Obviously, many modifications and variations are possible in light of the above description. These embodiments were chosen and described in this specification, in order to better explain the principles and the practical application of the present disclosure, so that one of ordinary skill in the art can better utilize the present disclosure and make modifications based on the present disclosure. The present disclosure is limited only by the claims and their full scope and equivalents.

What is claimed is:

1. An array substrate, comprising:
   a substrate;
   a data line on the base substrate and extending in a first direction; and
   a touch signal line on the base substrate, wherein an extending direction of the touch signal line is the same as an extending direction of the data line; the data line and the touch signal line are in different layers and insulated from each other, and an orthographic projection of the touch signal line on the base substrate at least partially overlaps an orthographic projection of the data line on the base substrate,
   wherein the array substrate further comprises a plurality of touch electrode units, each of which is coupled to a corresponding touch signal line; a layer, where the touch electrode unit is located, is on a side of the data line away from the base substrate;
   an orthographic projection of a gap between two touch electrode units adjacent in a second direction on the base substrate overlaps the orthographic projection of the data line on the base substrate; and
   the second direction is perpendicular to the first direction.

2. The array substrate according to claim 1, wherein the touch signal line is on a side of the data line away from the base substrate.

3. The array substrate according to claim 1, wherein the orthographic projection of the touch signal line on the base substrate completely covers the orthographic projection of the data line on the base substrate.

4. The array substrate according to claim 3, wherein the touch signal line has a center line extending in the first direction; the data line has a center line extending in the first direction; and
   an orthographic projection of the center line of the touch signal line on the base substrate completely overlaps an orthographic projection of the center line of the data line on the base substrate.

5. The array substrate according to claim 4, wherein a size of the touch signal line in a second direction is greater than a size of the data line in the second direction; and the second direction is perpendicular to the first direction.

6. The array substrate according to claim 1, wherein the layer, where the touch electrode unit is located, is between a layer where the touch signal line is located and a layer where the data line is located.

7. The array substrate according to claim 1, wherein an orthographic projection of the touch electrode unit on the base substrate partially overlaps an orthographic projection of the touch signal line on the base substrate.

8. The array substrate according to claim 7, wherein a length of an overlapping part between the orthographic projection of the touch electrode unit on the base substrate and the orthographic projection of the touch signal line on the base substrate in the second direction is in a range of 1.5 to 3 micrometers.

9. The array substrate according to claim 1, wherein the array substrate further comprises an organic insulating layer between a layer where the data line is located and a layer where the touch electrode unit is located.

10. The array substrate according to claim 9, wherein the array substrate further comprises a plurality of gate lines, a plurality of the data lines and a plurality of sub-pixels, and the plurality of gate lines and the plurality of the data lines define a plurality of sub-pixel regions, and the plurality of sub-pixels are correspondingly located in the plurality of sub-pixel regions; and each of the plurality of sub-pixels comprises a pixel electrode and a common electrode.

11. The array substrate according to claim 10, wherein the array substrate comprises a plurality of touch sub-regions, and the plurality of touch electrode units are located in the plurality of touch sub-regions in a one-to-one correspondence; each of the plurality of touch sub-region corresponds to multiple sub-pixel regions; and
    the common electrodes of the sub-pixels in a same touch sub-region are coupled together, and the coupled common electrodes serve as the touch electrode unit in the touch sub-region.

12. The array substrate according to claim 11, wherein the array substrate further comprises a first passivation layer; a layer where the common electrode is located, the first passivation layer, a layer where the touch signal line is located, and a layer where the pixel electrode is located, are sequentially arranged in a direction away from the base substrate; and
    the common electrode is coupled to the touch signal line through a first connection via at least penetrating through the first passivation layer.

13. The array substrate according to claim 12, wherein the array substrate further comprises a second passivation layer on a side of the layer, where the touch signal line is located, away from the base substrate;
    the first connection via comprises a first part and a second part, the first part penetrates through the first passivation layer, the layer where the touch signal line is located and the second passivation layer, exposing at least a part of the common electrode; and the second part penetrates through the second passivation layer, exposing at least a part of the touch signal line; and
    the array substrate further comprises a first connection pattern, and an orthographic projection of the first connection pattern on the base substrate covers orthographic projections of the first part and the second part of the first connection via on the base substrate, such that the first connection pattern couples the common electrode and the touch signal line together.

14. The array substrate according to claim 13, wherein the first connection pattern is in a same layer and is made of a same material as the pixel electrode.

15. The array substrate according to claim 12, wherein the sub-pixel further comprises a driving circuit, at least a part of an output electrode of the driving circuit is on a side of the organic insulating layer close to the base substrate; and
    the pixel electrode is coupled to the output electrode through a second connection via, and the second connection via penetrates through at least the organic insulating layer, the first passivation layer and the second passivation layer to expose the output electrode of the driving circuit, such that the pixel electrode is coupled to the output electrode.

16. The array substrate according to claim 15, wherein the driving circuit comprises a driving transistor; the second connection via comprises a first sub-via and a second sub-via; the first sub-via penetrates through the organic insulating layer, the second sub-via penetrates through the first passivation layer and the second passivation layer, and an orthographic projection of the first sub-via on the base substrate comprises an orthographic projection of the second sub-via on the base substrate; and the pixel electrode is coupled to the output electrode through the second sub-via.

17. The array substrate according to claim 11, wherein the array substrate further comprises an auxiliary electrode between two sub-pixel regions adjacent in a first direction and extending in the second direction; the common electrodes in the same touch sub-region are coupled together through the auxiliary electrode; and the auxiliary electrode has a conductivity greater than that of the common electrode.

18. The array substrate according to claim 17, wherein the array substrate further comprises a gate insulating layer, a third connection via, and a second connection pattern; at least a part of the gate insulating layer is on a side of the auxiliary electrode away from the base substrate; the third connection via comprises a third sub-via and a fourth sub-via; the third sub-via penetrates through the organic insulating layer; the fourth sub-via penetrates through the second passivation layer and the first passivation layer, exposing the auxiliary electrode and the common electrode; an orthographic projection of the third sub-via on the base substrate comprises an orthographic projection of the fourth sub-via on the base substrate; and an orthographic projection of the second connection pattern on the base substrate covers the orthographic projection of the fourth sub-via on the base substrate, such that the second connection pattern couples the auxiliary electrode and the common electrode together.

19. A display apparatus, comprising the array substrate according to claim 1.

* * * * *